US012606205B2

(12) United States Patent
Harada

(10) Patent No.: US 12,606,205 B2
(45) Date of Patent: Apr. 21, 2026

(54) ACTUATOR SYSTEM, VEHICLE, MOTION MANAGER, AND DRIVER ASSISTANCE SYSTEM

(71) Applicant: TOYOTA JIDOSHA KABUSHIKI KAISHA, Toyota (JP)

(72) Inventor: Takahisa Harada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 17/899,256

(22) Filed: Aug. 30, 2022

(65) Prior Publication Data

US 2023/0112872 A1     Apr. 13, 2023

(30) Foreign Application Priority Data

Sep. 30, 2021     (JP) ................................. 2021-160558

(51) Int. Cl.
*B60W 10/18* (2012.01)
*B60W 10/20* (2006.01)
*B60W 60/00* (2020.01)
(52) U.S. Cl.
CPC ........ *B60W 60/0011* (2020.02); *B60W 10/18* (2013.01); *B60W 10/20* (2013.01)
(58) Field of Classification Search
CPC ... B60W 60/0011; B60W 10/18; B60W 10/20
USPC ........................................................ 701/36
See application file for complete search history.

(56) References Cited

U.S. PATENT DOCUMENTS

| | | | | |
|---|---|---|---|---|
| 2009/0043407 A1* | 2/2009 | Mathiesen | ......... | G05B 19/4185 |
| | | | | 700/51 |
| 2017/0225689 A1* | 8/2017 | Mukai | ................... | B60W 20/40 |
| 2018/0356819 A1* | 12/2018 | Mahabadi | ............. | B60W 30/00 |
| 2019/0204828 A1 | 7/2019 | Ishikawa et al. | | |
| 2020/0070849 A1* | 3/2020 | Suzuki | ............... | B60W 10/184 |
| 2021/0094615 A1* | 4/2021 | Niewiadomski | ....... | B62D 13/00 |

FOREIGN PATENT DOCUMENTS

| | | | | | |
|---|---|---|---|---|---|
| GB | 2572743 A | * | 10/2019 | ............ | B60W 10/06 |
| JP | 2017-142679 A | | 8/2017 | | |
| JP | 2019119327 A | * | 7/2019 | ............ | B60W 10/04 |
| JP | 2020032894 A | * | 3/2020 | ............ | B60W 10/06 |

* cited by examiner

*Primary Examiner* — Muhammad Shafi
*Assistant Examiner* — Nazia Afrin
(74) *Attorney, Agent, or Firm* — OLIFF PLC.

(57) ABSTRACT

An actuator system to be provided in a vehicle and configured to realize a motion request includes one or more processors configured to receive predetermined information from a motion manager, and an actuator configured to realize the motion request by using the predetermined information. The one or more processors are configured to receive first information related to a state of the vehicle that is recognized by the motion manager. The one or more processors are configured to determine whether to permit control on the actuator by using a result of comparison between the first information and second information related to a current state of the vehicle.

8 Claims, 9 Drawing Sheets

| TARGET SHIFT RANGE | RECOGNIZED SHIFT RANGE | CURRENT SHIFT RANGE | DRIVING FORCE OUTPUT |
|---|---|---|---|
| D | D | D | PERMITTED |
| D | D | R | PROHIBITED |
| D | R | D | PROHIBITED |
| D | R | R | PROHIBITED |
| R | D | D | PROHIBITED |
| R | D | R | PROHIBITED |
| R | R | D | PROHIBITED |
| R | R | R | PERMITTED |

FIG. 8

| RECOGNIZED SHIFT RANGE | CURRENT SHIFT RANGE | DRIVING FORCE OUTPUT |
|---|---|---|
| D | D | PERMITTED |
| D | R | PROHIBITED |
| R | D | PROHIBITED |
| R | R | PERMITTED |

FIG. 10

| BRAKE PEDAL ON/OFF STATE | DRIVING FORCE OUTPUT |
|---|---|
| OFF | PERMITTED |
| ON (CONTINUED FOR PREDETERMINED PERIOD) | PROHIBITED |

ACTUATOR SYSTEM, VEHICLE, MOTION MANAGER, AND DRIVER ASSISTANCE SYSTEM

CROSS-REFERENCE TO RELATED APPLICATION

This application claims priority to Japanese Patent Application No. 2021-160558 filed on Sep. 30, 2021, incorporated herein by reference in its entirety.

BACKGROUND

1. Technical Field

The present disclosure relates to an actuator system, a vehicle, a motion manager, and a driver assistance system.

2. Description of Related Art

There is known a vehicle including a driver assistance system including a plurality of applications that sets and requests kinematic plans related to vehicle driver assistance, a motion manager that integrates a plurality of kinematic plans from the driver assistance system and sets a motion request based on the integrated kinematic plans, and an actuator system that realizes the set motion request.

Regarding such a vehicle, for example, Japanese Unexamined Patent Application Publication No. 2020-032894 (JP 2020-032894 A) discloses a technology for an actuator system that receives a motion request from a motion manager.

SUMMARY

In the vehicle described above, when the vehicle state is changed due to a user's operation during the driver assistance by the driver assistance system, the vehicle state that is a precondition for setting the kinematic plan in the driver assistance system differs from the vehicle state changed due to the user's operation. Therefore, a vehicle motion that is not based on the driver assistance may be requested.

The present disclosure provides an actuator system, a vehicle, a motion manager, and a driver assistance system that suppress the request for the vehicle motion that is not based on the driver assistance.

An actuator system according to a first aspect of the present disclosure is an actuator system to be provided in a vehicle and configured to realize a motion request generated by a motion manager configured to arbitrate kinematic plans related to driver assistance for the vehicle. The motion request is generated by using a result of arbitration of the kinematic plans. The actuator system includes one or more processors configured to receive predetermined information from the motion manager, and an actuator configured to realize the motion request by using the predetermined information. The one or more processors are configured to receive first information related to a state of the vehicle that is recognized by the motion manager. The one or more processors are configured to determine whether to permit control on the actuator by using a result of comparison between the first information and second information related to a current state of the vehicle.

In the actuator system according to the first aspect of the present disclosure, whether to permit the control on the actuator is determined based on the result of comparison between the state of the vehicle that is recognized by the motion manager and the current state of the vehicle. Therefore, it is possible to suppress the request for the vehicle motion that is not based on the driver assistance.

In the actuator system according to the first aspect of the present disclosure, the kinematic plans may be received by the motion manager from a driver assistance system configured to set the kinematic plans. The one or more processors may be configured to receive third information related to a state of the vehicle that is a precondition for setting the kinematic plans in the driver assistance system. The one or more processors may be configured to determine whether to permit the control on the actuator by using a result of comparison among the first information, the second information, and the third information.

In the actuator system according to the first aspect of the present disclosure, whether to permit the control on the actuator is determined based on the result of comparison among the state of the vehicle that is the precondition for setting the kinematic plans, the state of the vehicle that is recognized by the motion manager, and the current state of the vehicle. Therefore, it is possible to suppress the request for the vehicle motion that is not based on the driver assistance.

The actuator system according to the first aspect of the present disclosure may further include a storage configured to store the second information.

In the actuator system according to the first aspect of the present disclosure, it is possible to acquire the information about the current state of the vehicle by using the storage.

In the actuator system according to the first aspect of the present disclosure, the one or more processors may be configured to control the actuator.

In the actuator system according to the first aspect of the present disclosure, it is possible to determine whether to permit the control on the actuator by using the one or more processors.

In the actuator system according to the first aspect of the present disclosure, the one or more processors may be configured to receive the second information, and store the received second information in the storage.

In the actuator system according to the first aspect of the present disclosure, it is possible to acquire the information about the current state of the vehicle by using the storage.

In the actuator system according to the first aspect of the present disclosure, the one or more processors may be configured to, when at least two of the first information, the second information, and the third information agree with each other, permit the control on the actuator configured to realize the motion request.

In the actuator system according to the first aspect of the present disclosure, it is possible to determine whether to permit the control on the actuator by using the first information, the second information, and the third information.

In the actuator system according to the first aspect of the present disclosure, the state of the vehicle may include a state of the actuator.

In the actuator system according to the first aspect of the present disclosure, it is possible to determine whether to permit the control on the actuator by using at least the state of the actuator that is recognized by the motion manager and the current state of the actuator.

In the actuator system according to the first aspect of the present disclosure, the one or more processors may be configured to, when the state of the vehicle is a predetermined state, control the actuator to realize the motion request.

Thus, it is possible to suppress execution of the control on the actuator when the state of the vehicle is not the predetermined state.

A vehicle according to a second aspect of the present disclosure includes a driver assistance system configured to set a kinematic plan related to driver assistance for the vehicle, a motion manager configured to arbitrate multiple kinematic plans set by the driver assistance system, and an actuator system configured to realize a motion request generated by using a result of arbitration of the kinematic plans in the motion manager. The actuator system includes one or more processors configured to receive predetermined information from the motion manager, and an actuator configured to realize the motion request by using the predetermined information. The one or more processors are configured to receive first information related to a state of the vehicle that is recognized by the motion manager. The one or more processors are configured to determine whether to permit control on the actuator by using a result of comparison between the first information and second information related to a current state of the vehicle.

A motion manager according to a third aspect of the present disclosure includes one or more processors. The one or more processors are configured to receive, from a driver assistance system configured to set a kinematic plan related to driver assistance for a vehicle, a plurality of the kinematic plans, and arbitrate the kinematic plans. The one or more processors are configured to generate a motion request by using a result of arbitration of the kinematic plans, and transmit, to an actuator system provided in the vehicle, the generated motion request and first information related to a state of the vehicle that is recognized by the motion manager. Whether to permit control on the actuator system is determined by using a result of comparison between the first information and second information related to a current state of the vehicle.

A driver assistance system according to a fourth aspect of the present disclosure includes one or more processors configured to set a kinematic plan related to driver assistance for a vehicle, transmit the set kinematic plan to a motion manager configured to generate a motion request for the vehicle, and transmit, to an actuator system provided in the vehicle, information related to a state of the vehicle that is a precondition for setting the kinematic plan. Whether to permit control on the actuator system is determined by using a result of comparison among the information related to the state of the vehicle that is the precondition for setting the kinematic plan, information related to a state of the vehicle that is recognized by the motion manager, and information related to a current state of the vehicle.

According to the present disclosure, it is possible to provide the actuator system, the vehicle, the motion manager, and the driver assistance system that suppress the request for the vehicle motion that is not based on the driver assistance.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 8 is a diagram showing a relationship between a state of each shift range and whether to permit driving force output in the modification;

FIG. 10 is a diagram showing a relationship between a state of a brake pedal and whether to permit driving force output.

DETAILED DESCRIPTION OF EMBODIMENTS

Figure 1:
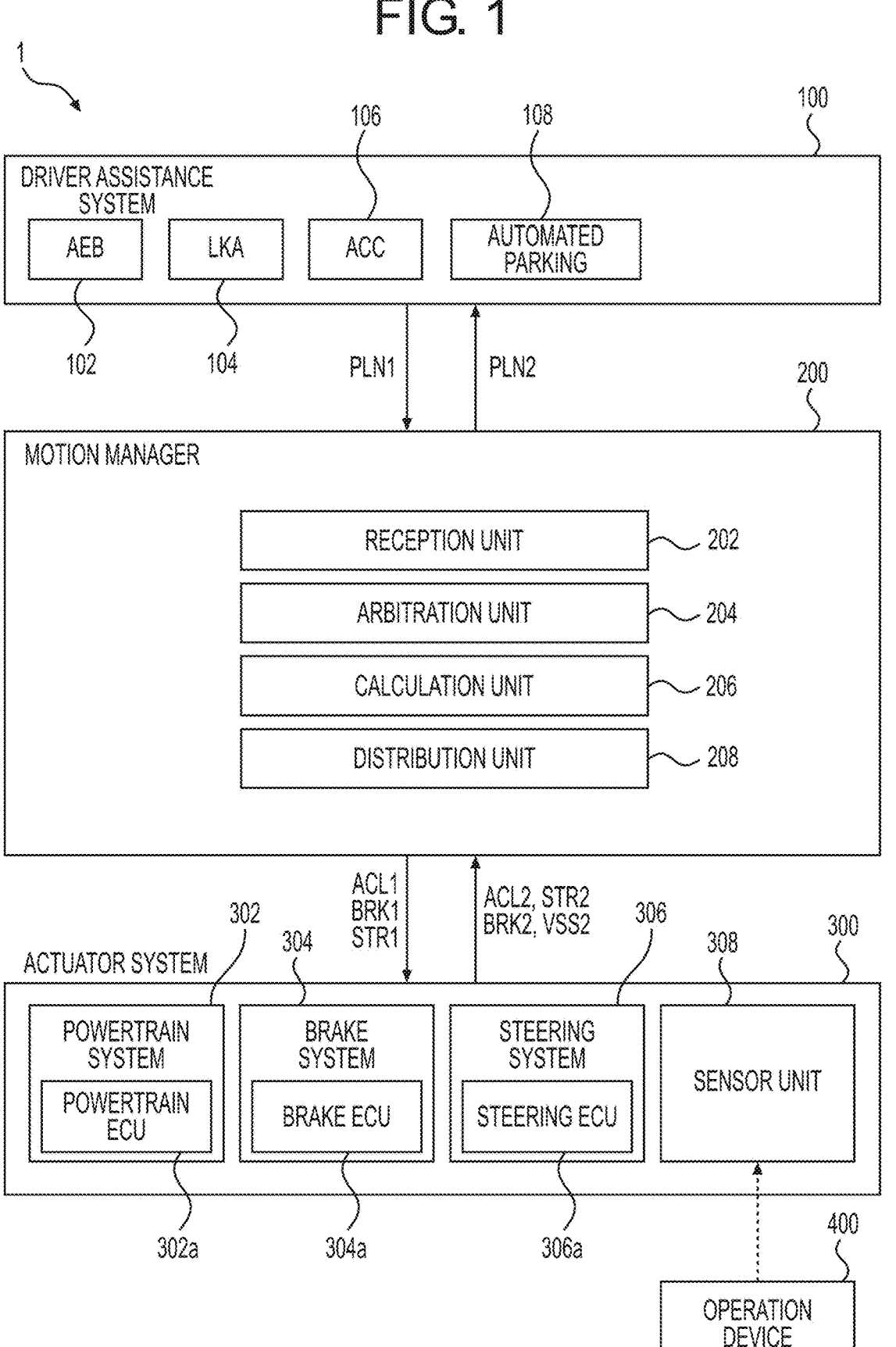
FIG. 1 is a diagram showing an example of a configuration of a vehicle.

An embodiment of the present disclosure will be described below in detail with reference to the drawings. The same or corresponding parts in the drawings are denoted by the same reference signs, and the description thereof will not be repeated.

FIG. 1 is a diagram showing an example of a configuration of a vehicle 1. The vehicle 1 may be any vehicle having a configuration capable of realizing functions of a driver assistance system 100 described later. Examples of the vehicle 1 include a vehicle including an engine as a driving source, a battery electric vehicle including an electric motor as a driving source, and a hybrid electric vehicle including an engine and an electric motor and using at least one of the engine and the electric motor as a driving source.

The vehicle 1 includes the driver assistance system 100 having functions related to driver assistance for the vehicle 1, a motion manager 200, and an actuator system 300.

The driver assistance system 100 implements various functions for assisting driving of the vehicle 1 including at least one of steering control, drive control, and braking control on the vehicle 1 by executing an application installed in a computer such as an electronic control unit (ECU) including a processor such as a central processing unit (CPU), a memory, and an input/output interface. The driver assistance system 100 includes a plurality of applications. Examples of the applications in the driver assistance system 100 include an application that implements functions of an autonomous driving (AD) system, an application that implements functions of an automated parking system, and an application that implements functions of an advanced driver assist system (ADAS) (hereinafter referred to as "ADAS application").

For example, the ADAS application includes at least one of an application that implements functions of follow-up traveling (adaptive cruise control (ACC), etc.) for keeping a constant vehicle-to-vehicle distance from a preceding vehicle, an application that implements functions of an auto-speed limiter (ASL) for keeping an upper limit of a vehicle speed by recognizing a vehicle speed limit, an application that implements functions of lane keeping assistance (lane keeping assist (LKA), lane tracing assist (LTA), etc.) for keeping a traveling lane, an application that implements functions of collision damage reducing braking (autonomous emergency braking (AEB), pre-crash safety (PCS), etc.) for automatically applying a brake to reduce damage in a collision, and an application that implements functions of lane deviation warning (lane departure warning (LDW), lane departure alert (LDA), etc.) for warning a driver about deviation from a traveling lane of the vehicle 1.

For example, the driver assistance system 100 shown in FIG. 1 includes AEB 102, LKA 104, ACC 106, and automated parking 108 as applications.

Each application included in the driver assistance system 100 outputs, to the motion manager 200, a request for a kinematic plan that guarantees commerciality (function) of the application alone based on, for example, information on vehicle surroundings acquired (input) from a plurality of sensors (not shown) and a driver's assistance request. Examples of the sensors include a vision sensor such as a forward camera, a radar, a light detection and ranging (LiDAR) sensor, and a position detection device.

The forward camera is arranged, for example, on the back of a rear-view mirror in a vehicle cabin, and is used to capture an image of a view ahead of the vehicle. The radar is a distance measuring device that irradiates an object with a radio wave having a short wavelength, detects the radio wave returned from the object, and measures a distance and a direction to the object. The LiDAR sensor is a distance measuring device that radiates a pulsed laser beam (light such as infrared rays) and measures a distance based on a period that passes until the laser beam returns after being reflected by an object. Examples of the position detection device include a global positioning system (GPS) receiver that detects a position of the vehicle 1 by using information received from a plurality of satellites orbiting the earth.

Each application acquires, as recognized sensor information, information on vehicle surroundings obtained by integrating detection results from one or more sensors, and also acquires a driver's assistance request via a user interface (not shown) such as a switch. For example, each application can recognize other vehicles, obstacles, or persons around the vehicle by image processing using artificial intelligence (AI) or an image processor for images or videos of views around the vehicle acquired by the sensors.

The kinematic plan includes, for example, a request related to a longitudinal acceleration or deceleration to be generated in the vehicle 1, a request related to a steering angle of the vehicle 1, and a request related to stop keeping in the vehicle 1.

Examples of the request related to the longitudinal acceleration or deceleration to be generated in the vehicle 1 include an operation request for a powertrain system 302, and an operation request for a brake system 304.

Examples of the request related to stop keeping in the vehicle 1 include a request related to permission or prohibition of an operation of at least one of an electric parking brake and a parking lock mechanism (neither shown).

For example, the electric parking brake limits rotation of wheels of the vehicle 1 by an operation of an actuator. The electric parking brake may limit the rotation of the wheels by, for example, operating a parking brake provided on a part of the wheels of the vehicle 1 by using the actuator. Alternatively, the electric parking brake may limit the rotation of the wheels by operating an actuator for the parking brake to adjust a hydraulic pressure to be supplied to a braking device of the brake system 304 and actuating the braking device.

The parking lock mechanism limits rotation of an output shaft of a transmission by an operation of an actuator. In the parking lock mechanism, for example, a protrusion at the tip of a parking lock pawl whose position is adjusted by an actuator is fitted to teeth of a gear (lock gear) coupled to a rotating element in the transmission of the vehicle 1. Thus, the rotation of the output shaft of the transmission is limited, thereby limiting the rotation of driving wheels.

The applications in the driver assistance system 100 is not particularly limited to the applications described above, and an application that implements other functions may be added or any existing application may be omitted. The number of installed applications is not particularly limited.

The motion manager 200 requests the actuator system 300 to move the vehicle 1 in accordance with a kinematic plan set by at least one of the applications in the driver assistance system 100. The detailed configuration of the motion manager 200 will be described later.

The actuator system 300 is configured to realize a motion request for the vehicle 1 that is output from the motion manager 200. The actuator system 300 includes a plurality of types of actuator system. FIG. 1 shows an example in which the actuator system 300 includes the powertrain system 302, the brake system 304, and a steering system 306 as the plurality of types of actuator system. The number of actuator systems to which the motion manager 200 requests motion is not limited to three as described above, and may be four or more, or may be two or less.

The powertrain system 302 includes a powertrain actuator 302*b* (see FIG. 2) capable of generating a driving force on the driving wheels of the vehicle 1, and a powertrain electronic control unit (ECU) 302*a* (see FIG. 2) that controls an operation of the powertrain actuator 302*b*. The powertrain ECU is an electronic control unit including a processor such as a CPU, and a memory. For example, the powertrain actuator 302*b* includes at least one of an internal combustion engine such as a gasoline engine or a diesel engine, a transmission including a gearbox and a differential, a motor generator serving as a driving source, a power storage device that stores electric power to be supplied to the motor generator, a power conversion device that mutually converts electric power between the motor generator and the power storage device, and a power generation source such as a fuel cell. The powertrain ECU 302*a* controls devices associated with the powertrain system 302 to realize a motion request from the motion manager 200 on the associated devices.

The brake system 304 includes, for example, a plurality of braking devices provided on the wheels of the vehicle 1. Examples of the braking device include a hydraulic brake such as a disc brake that uses a hydraulic pressure to generate a braking force. Examples of the braking device also include a motor generator connected to a wheel to generate a regenerative torque. The braking operation of the vehicle 1 using the braking devices is controlled by a brake ECU (304*a*). The brake ECU is an electronic control unit including a processor such as a CPU, and a memory. The brake ECU includes, for example, a control unit (not shown) for controlling the brake system 304 separately from the motion manager 200.

The steering system 306 includes, for example, a steering device capable of changing a steering angle of steered wheels (for example, front wheels) of the vehicle 1, and an ECU for controlling the operation of the steering device. The steering device includes, for example, a steering wheel that changes the steering angle based on an operation amount, and an electric power steering system (EPS) capable of adjusting the steering angle by using an actuator separately from the operation of the steering wheel. The ECU 306*a* that controls the operation of the steering device is an electronic control unit including a processor such as a CPU, and a memory, and controls the operation of the actuator of the EPS.

In the vehicle 1 having the configuration described above, the driver assistance system 100 transmits, for example, to the motion manager 200, a request signal PLN1 indicating a request for a kinematic plan set by at least one of the applications.

The request signal PLN1 includes, for example, information about a target (request) acceleration set as one of the kinematic plans in the AEB 102, the ACC 106, or the automated parking 108, or information about a target (request) curvature set as one of the kinematic plans in the LKA 104.

The motion manager 200 sets a motion requested in the vehicle 1 based on the request for the kinematic plan in the received request signal PLN1, and requests the actuator system 300 to realize the set motion. That is, the motion manager 200 transmits, to the actuator system 300, a request signal ACL1 indicating a request for an operation on the powertrain system 302. The motion manager 200 transmits, to the actuator system 300, a request signal BRK1 indicating a request for an operation on the brake system 304. The motion manager 200 transmits, to the actuator system 300, a request signal STR1 indicating a request for an operation on the steering system 306.

The request signal ACL1 includes, for example, information on a requested value of a driving torque or driving force, information on a requested shift range (including information on a target shift range and a recognized shift range described below), and information on a method for arbitration (for example, whether to select a maximum value or a minimum value, change the value stepwise, or change the value gradually). Examples of the shift range include a forward travel range (hereinafter referred to as "D range" or simply as "D") and a reverse travel range (hereinafter referred to as "R range" or simply as "R").

The request signal BRK1 includes, for example, information on a requested value of a braking torque, information on a method for arbitration (for example, whether to change the value stepwise or change the value gradually), and information on a braking execution timing (whether to execute braking immediately).

The request signal STR1 includes, for example, information on a target (request) steering angle, information on whether the target steering angle is effective, and information on upper and lower limit torques of an assist torque for a steering wheel operation.

An actuator system that has received a corresponding request signal among the plurality of types of actuator system constituting the actuator system 300 is controlled to realize the operation request in the request signal.

An example of the configuration of the motion manager 200 will be described below. As shown in FIG. 1, the motion manager 200 includes a reception unit 202, an arbitration unit 204, a calculation unit 206, and a distribution unit 208. The motion manager 200 is implemented by a computer such as an electronic control unit (ECU) including a processor such as a CPU, a memory, and an input/output interface.

The reception unit 202 receives a kinematic plan request output by one or more applications in the driver assistance system 100.

The arbitration unit 204 arbitrates multiple kinematic plan requests received from the respective applications via the reception unit 202. Examples of a process of the arbitration include a process of selecting one kinematic plan from among the kinematic plans based on a predetermined selection criterion. As another example of the process of the arbitration, a new kinematic plan may be set based on the kinematic plans. The arbitration unit 204 may arbitrate the kinematic plan requests by further adding predetermined information received from the actuator system 300. The arbitration unit 204 may determine whether to temporarily give priority to a motion of the vehicle 1 that is requested based on a driver's status (for example, a status of operation on an operation device 400) and a vehicle status over a motion of the vehicle 1 that is associated with the kinematic plan determined based on the arbitration result.

The calculation unit 206 calculates a motion request based on a result of the arbitration of the kinematic plan requests in the arbitration unit 204 and a motion of the vehicle 1 that is determined based on the arbitration result. This motion request is a physical quantity for controlling at least one of the actuator systems in the actuator system 300, and includes a physical quantity different from the physical quantity of the kinematic plan request. For example, when the kinematic plan request (first request) is a longitudinal acceleration, the calculation unit 206 calculates, as the motion request (second request), a value obtained by converting the acceleration into a driving force or a driving torque.

The distribution unit 208 distributes (transmits) the motion request calculated by the calculation unit 206 to at least one actuator system in the actuator system 300. For example, when acceleration of vehicle 1 is requested, the distribution unit 208 distributes the motion request only to the powertrain system 302. Alternatively, when deceleration of the vehicle 1 is requested, the distribution unit 208 appropriately distributes the motion request to the powertrain system 302 and the brake system 304 to realize a target deceleration. The distribution unit 208 corresponds to a "transmission unit" that transmits a motion request to the actuator system 300.

Information about the state of the powertrain system 302 in the actuator system 300 is transmitted from the powertrain system 302 to the motion manager 200 as a signal ACL2. The information about the state of the powertrain system 302 includes, for example, information on an operation on an accelerator pedal, information on an actual driving torque or an actual driving force of the powertrain system 302, actual shift range information (including information on a current shift range described below), information on upper and lower limits of the driving torque, information on upper and lower limits of the driving force, and information on the reliability of the powertrain system 302.

Information about the state of the brake system 304 in the actuator system 300 is transmitted from the brake system 304 to the motion manager 200 as a signal BRK2. The information about the state of the brake system 304 includes, for example, information on an operation on a brake pedal, information on a braking torque requested by the driver, information on a requested value of the braking torque after arbitration, information on an actual braking torque after arbitration, and information on the reliability of the brake system 304.

Information about the state of the steering system 306 in the actuator system 300 is transmitted from the steering system 306 to the motion manager 200 as a signal STR2. The information about the state of the steering system 306 includes, for example, information on the reliability of the steering system 306, information on whether the driver is holding the steering wheel, information on a torque for operating the steering wheel, and information on a rotation angle of the steering wheel.

The actuator system 300 also includes a sensor unit 308 in addition to the powertrain system 302, the brake system 304, and the steering system 306.

The sensor unit 308 includes a plurality of sensors that detects behavior of the vehicle 1. The sensor unit 308 includes, for example, a longitudinal gravitational force sensor that detects a longitudinal vehicle body acceleration of the vehicle 1, a lateral gravitational force sensor that detects a lateral vehicle body acceleration of the vehicle 1, a wheel velocity sensor that is provided on each wheel and detects a wheel velocity, and a yaw rate sensor that detects an angular velocity of a rotation angle in a yaw direction (yaw angle). The sensor unit 308 transmits information including detection results from the sensors to the motion manager 200 as a signal VSS2. That is, the signal VSS2 includes, for example, a detection value of the longitudinal gravitational force sensor, a detection value of the lateral gravitational force sensor, a detection value of the wheel velocity sensor of each wheel, a detection value of the yaw rate sensor, and information on the reliability of each sensor.

The operation device 400 includes operation members to be operated by a user serving as the driver, such as the brake pedal and a shift lever for changing the shift range. The position of the shift lever is detected, for example, by a detection device that detects the position of the shift lever. The position of the brake pedal is detected by a detection device that detects an amount of depression of the brake pedal. The sensor unit 308 further includes the various detection devices described above.

When various signals are received from the actuator system 300, the motion manager 200 transmits predetermined information (including information on a current shift range described below) to the driver assistance system 100 as a signal PLN2.

The configurations of the devices mounted on the vehicle 1 and the configuration of the motion manager 200 are illustrative, and any component may be added, replaced, changed, or omitted as appropriate. The functions of each device can be executed by integration of the functions into one device or distribution of the functions between or among a plurality of devices as appropriate.

In the vehicle 1 having the configuration described above, when the vehicle state is changed due to a user's operation (for example, the shift range is changed by operating the shift lever or the brake pedal is depressed) during the driver assistance by the driver assistance system 100 (for example, during automated parking or follow-up traveling), the vehicle state that is a precondition for setting the kinematic plan in the driver assistance system 100 differs from the vehicle state changed due to the user's operation. Therefore, a motion of the vehicle 1 that is not based on the driver assistance may be requested.

Figure 2:
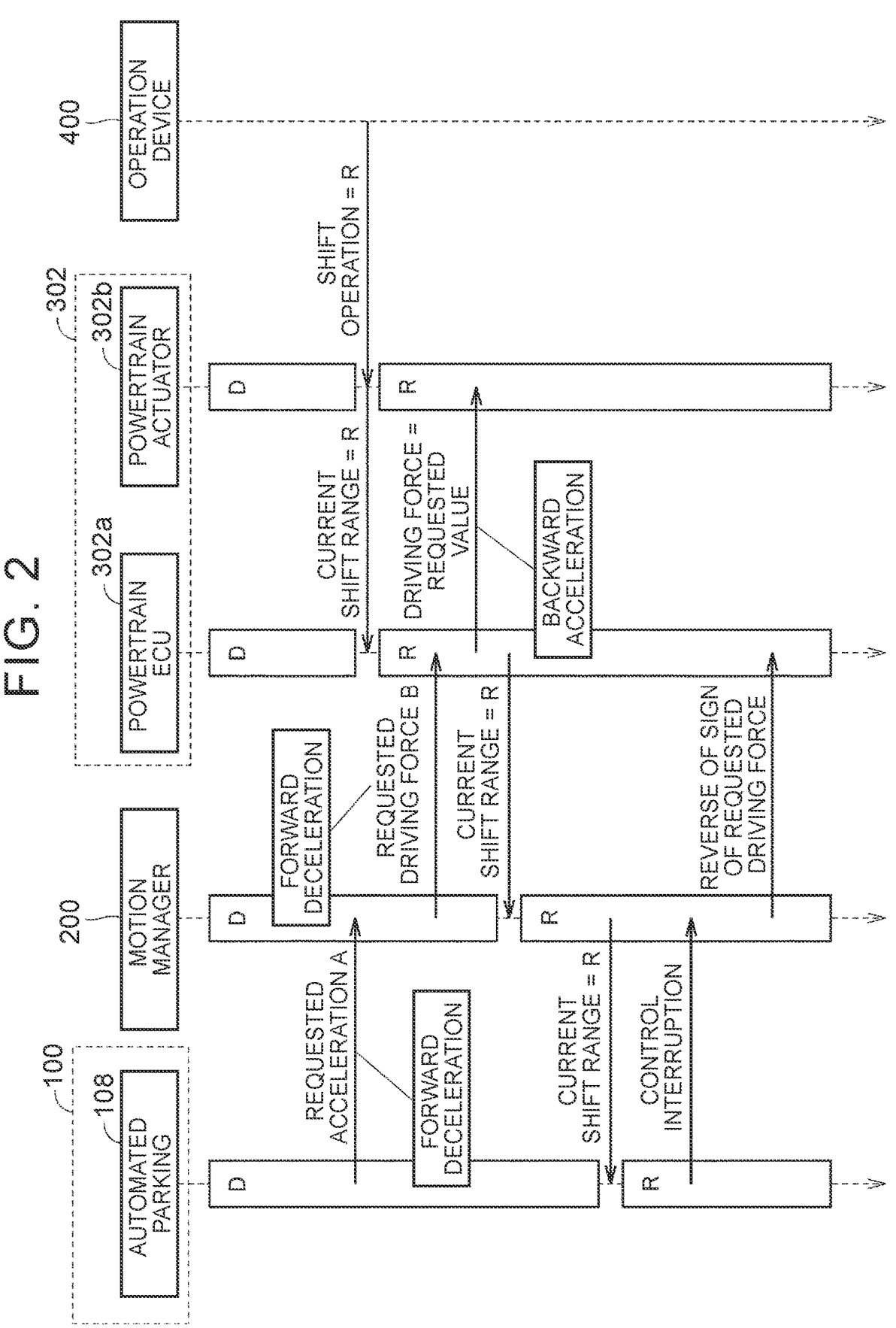
FIG. 2 is a diagram for describing a case where a vehicle motion that is not based on driver assistance is requested.

Referring to FIG. 2, a case where the motion of the vehicle 1 that is not based on the driver assistance is requested will be described below taking the state of the shift range as an example of the state of the vehicle 1. FIG. 2 is a diagram for describing the case where the motion of the vehicle 1 that is not based on the driver assistance is requested.

In FIG. 2, for example, it is assumed that the vehicle 1 is requested to decelerate forward during the automated parking. FIG. 2 shows operations of the application of the automated parking 108, the motion manager 200, the powertrain system 302, and the operation device 400. As shown in FIG. 2, the powertrain system 302 includes the powertrain ECU 302a and the powertrain actuator 302b. Examples of the powertrain actuator 302b associated with the application of the automated parking 108 include an automatic transmission and a driving source such as an engine. The powertrain ECU 302a controls the powertrain actuator 302b.

In FIG. 2, it is assumed that the shift range is recognized as the D range in each of the application of the automated parking 108, the motion manager 200, the powertrain ECU 302a, and the powertrain actuator 302b.

In such a case, it is assumed that the application of the automated parking 108 requests, for example, forward deceleration. At this time, a requested acceleration A (negative value) [m/s$^2$] is output from the driver assistance system 100 to the motion manager 200 on the precondition that the shift range is the D range.

When the negative value is requested as the requested acceleration, the motion manager 200 converts the requested acceleration A into a requested driving force B (negative value) [N], and outputs the requested driving force B obtained by the conversion to the powertrain system 302.

When the user performs a shift operation on the operation device 400 (shift lever) to change the shift range to the R range before the requested driving force B is input from the motion manager 200, the shift range is changed from the D range to the R range in the powertrain actuator 302b, and the shift range recognized by the powertrain ECU 302a is changed from the D range to the R range.

When the requested driving force B is output from the motion manager 200 in such a situation, the requested driving force B (negative value) is input while the shift range is the R range. Therefore, backward acceleration is requested. As a result, a motion (backward acceleration) of the vehicle 1 that is not based on the driver assistance may be requested.

When the motion manager 200 subsequently receives the changed shift range from the actuator system 300, the motion manager 200 transmits the received shift range to the application of the automated parking 108 in the driver assistance system 100. The application of the automated parking 108 sets control interruption because the precondition shift range has been changed from the D range to the R range. In response to the setting of the control interruption, the motion manager 200 executes a predetermined process of, for example, reversing the sign of the requested driving force.

To suppress the request for the motion of the vehicle 1 that is not based on the driver assistance as described above, the powertrain ECU 302a of the present embodiment receives, from the motion manager 200, first information about the state of the vehicle that is recognized by the motion manager 200, and determines whether to permit control on the actuator system 300 (that is, driving force output) by using a result of comparison between the first information and second information about a current state of the vehicle 1.

Thus, it is possible to control the actuator system 300 based on the result of comparison between the shift range recognized by the motion manager 200 and the current shift range of the vehicle 1. Accordingly, it is possible to suppress the request for the motion of the vehicle 1 that is not based on the driver assistance.

Figure 3:
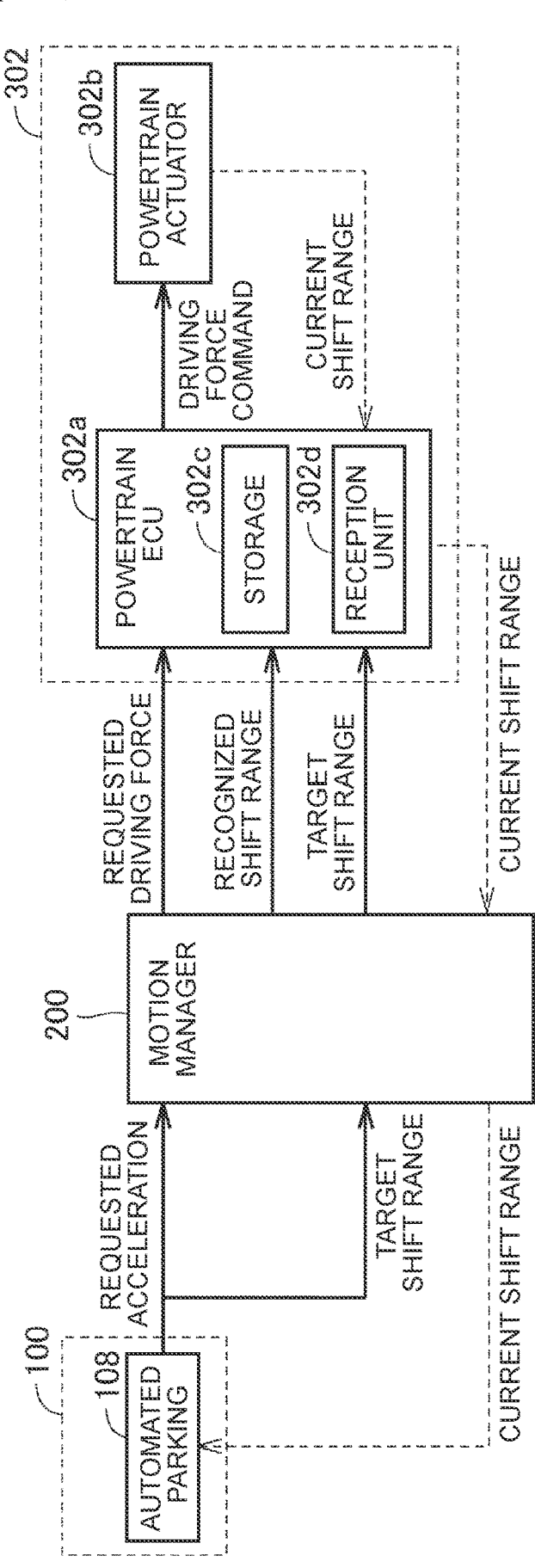
FIG. 3 is a diagram for describing an example of vehicle operations.

An example of operations of the vehicle 1 in the present embodiment will be described below with reference to FIG. 3. FIG. 3 is a diagram for describing an example of the operations of the vehicle 1.

As shown in FIG. 3, for example, it is assumed that the application of the automated parking 108 in the driver assistance system 100 outputs a requested acceleration (negative value) to the motion manager 200.

For example, during the automated parking, the application of the automated parking 108 generates information about the requested acceleration and information about a precondition shift range (hereinafter referred to as "target shift range"), and outputs the generated pieces of information to the motion manager 200.

The motion manager 200 converts the requested acceleration received from the application of the automated parking 108 into a requested driving force, and transmits the received target shift range to the powertrain system 302 together with a shift range recognized by the motion manager (hereinafter referred to as "recognized shift range").

As described above, the powertrain system 302 includes the powertrain ECU 302a and the powertrain actuator 302b. The powertrain ECU 302a includes a storage 302c and a reception unit 302d.

The reception unit 302d receives the requested driving force, the recognized shift range, and the target shift range from the motion manager 200, and receives a current shift range from the powertrain actuator 302b. The powertrain ECU 302a stores the received information in the storage 302c. The storage 302c is a rewritable storage medium such as a memory.

For example, when the shift range is changed by the actuator that changes the shift range of the transmission in the powertrain actuator 302b, the powertrain ECU 302a acquires the changed shift range from the powertrain actuator 302b as a current shift range, and stores the current shift range in the storage 302c.

The powertrain ECU 302a compares the target shift range, the recognized shift range, and the current shift range, and determines whether to permit control on the powertrain actuator 302b by using a comparison result.

The powertrain ECU 302a reads the current shift range, the recognized shift range, and the target shift range from the storage 302c, and determines whether these shift ranges agree with each other. When the three shift ranges agree with each other, the powertrain ECU 302a permits the control on the powertrain actuator 302b using the requested driving force obtained by the conversion (that is, output of a driving force command (may hereinafter be referred to as "driving force output")). The powertrain ECU 302a prohibits the control on the powertrain actuator 302b when any one of the three shift ranges does not agree with the other shift ranges.

Figures 4, 5:
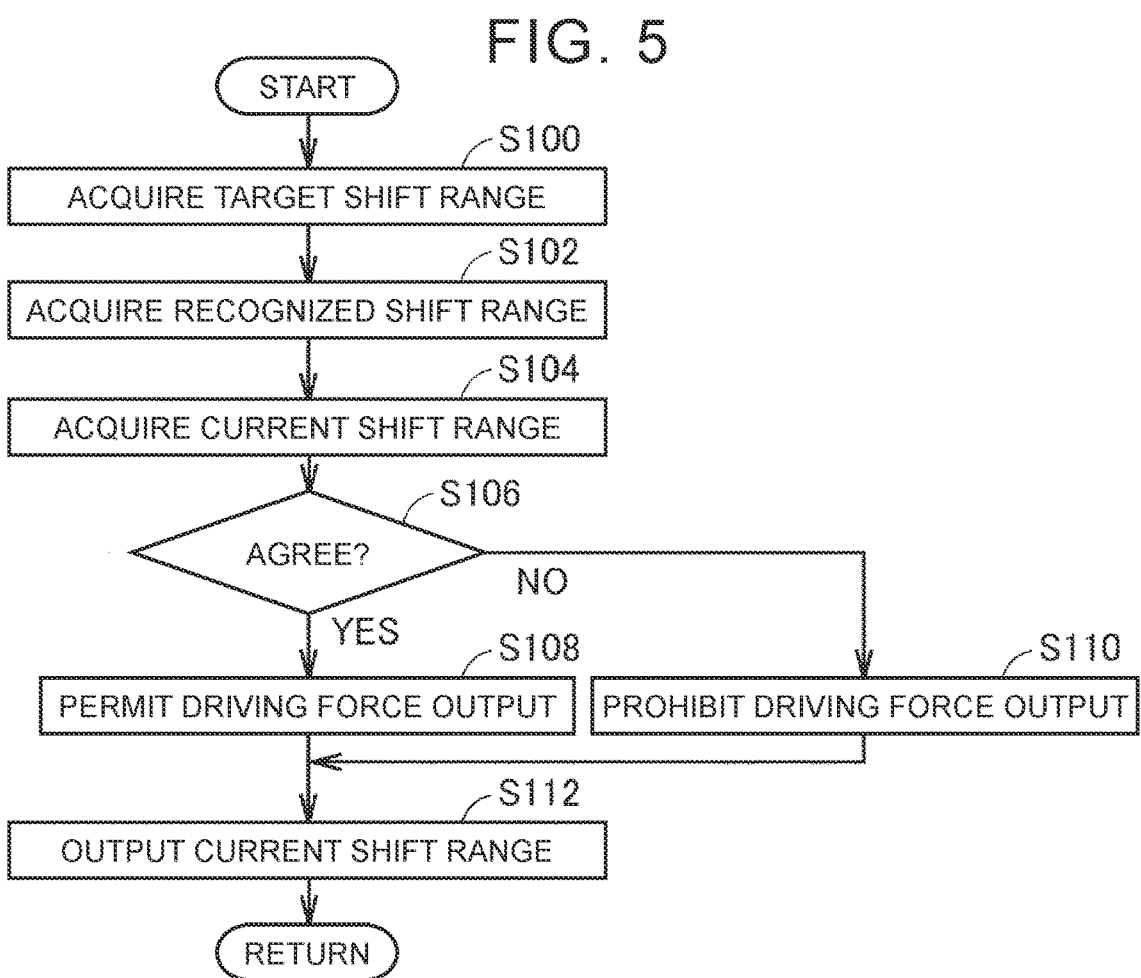
FIG. 4 is a diagram showing a relationship between a state of each shift range and whether to permit driving force output.
FIG. 5 is a flowchart showing an example of a process to be executed by a powertrain electronic control unit (ECU)

Referring to FIG. 4, description will be given of a combination in which the control on the powertrain actuator 302b is permitted and a combination in which the control on the powertrain actuator 302b is prohibited among a plurality of combinations of the three shift ranges. FIG. 4 is a diagram showing a relationship between a state of each shift range and whether to permit the driving force output.

As shown in FIG. 4, for example, when all of the target shift range, the recognized shift range, and the current shift range are the D range, the driving force output in the automated parking is permitted. Alternatively, when all of the target shift range, the recognized shift range, and the current shift range are the R range, the driving force output in the automated parking is permitted.

When the target shift range is the D range but at least one of the recognized shift range and the current shift range is the R range, the driving force output in the automated parking is prohibited. Alternatively, when the target shift range is the R range but at least one of the recognized shift range and the current shift range is the D range, the driving force output in the automated parking is prohibited.

An example of a process to be executed by the powertrain ECU 302a will be described below with reference to FIG. 5.

FIG. 5 is a flowchart showing an example of the process to be executed by the powertrain ECU 302a. A series of processes shown in this flowchart is repeatedly executed by the powertrain ECU 302a at predetermined control cycles.

In Step ("Step" is hereinafter referred to as "S") 100, the powertrain ECU 302a acquires a target shift range. For example, the powertrain ECU 302a may acquire the target shift range from the motion manager 200 or by reading the target shift range from the storage 302c.

In S102, the powertrain ECU 302a acquires a recognized shift range. For example, the powertrain ECU 302a may acquire the recognized shift range from the motion manager 200 or by reading the recognized shift range from the storage 302c.

In S104, the powertrain ECU 302a acquires a current shift range. For example, the powertrain ECU 302a may acquire the current shift range from the powertrain actuator 302b or by reading the current shift range from the storage 302c.

In S106, the powertrain ECU 302a determines whether the acquired target shift range, the acquired recognized shift range, and the acquired current shift range agree with each other. The powertrain ECU 302a determines that the target shift range, the recognized shift range, and the current shift range agree with each other when all of the target shift range, the recognized shift range, and the current shift range are the D range or all of the target shift range, the recognized shift range, and the current shift range are the R range. When determination is made that the target shift range, the recognized shift range, and the current shift range agree with each other (YES in S106), the process proceeds to S108.

In S108, the powertrain ECU 302a permits driving force output. For example, during the automated parking, the powertrain ECU 302a permits the driving force output in the automated parking. For example, the powertrain ECU 302a generates a driving force command by using a requested driving force from the motion manager 200, and outputs the generated driving force command to the powertrain actuator 302b. When determination is made that the target shift range, the recognized shift range, and the current shift range do not agree with each other (NO in S106), the process proceeds to S110.

In S110, the powertrain ECU 302a prohibits the driving force output. Therefore, the powertrain ECU 302a does not request a driving force or requests zero as the driving force.

In S112, the powertrain ECU 302a outputs the current shift range to the motion manager 200. The motion manager 200 outputs the current shift range received from the powertrain ECU 302a to the application of the automated parking 108.

Figure 6:
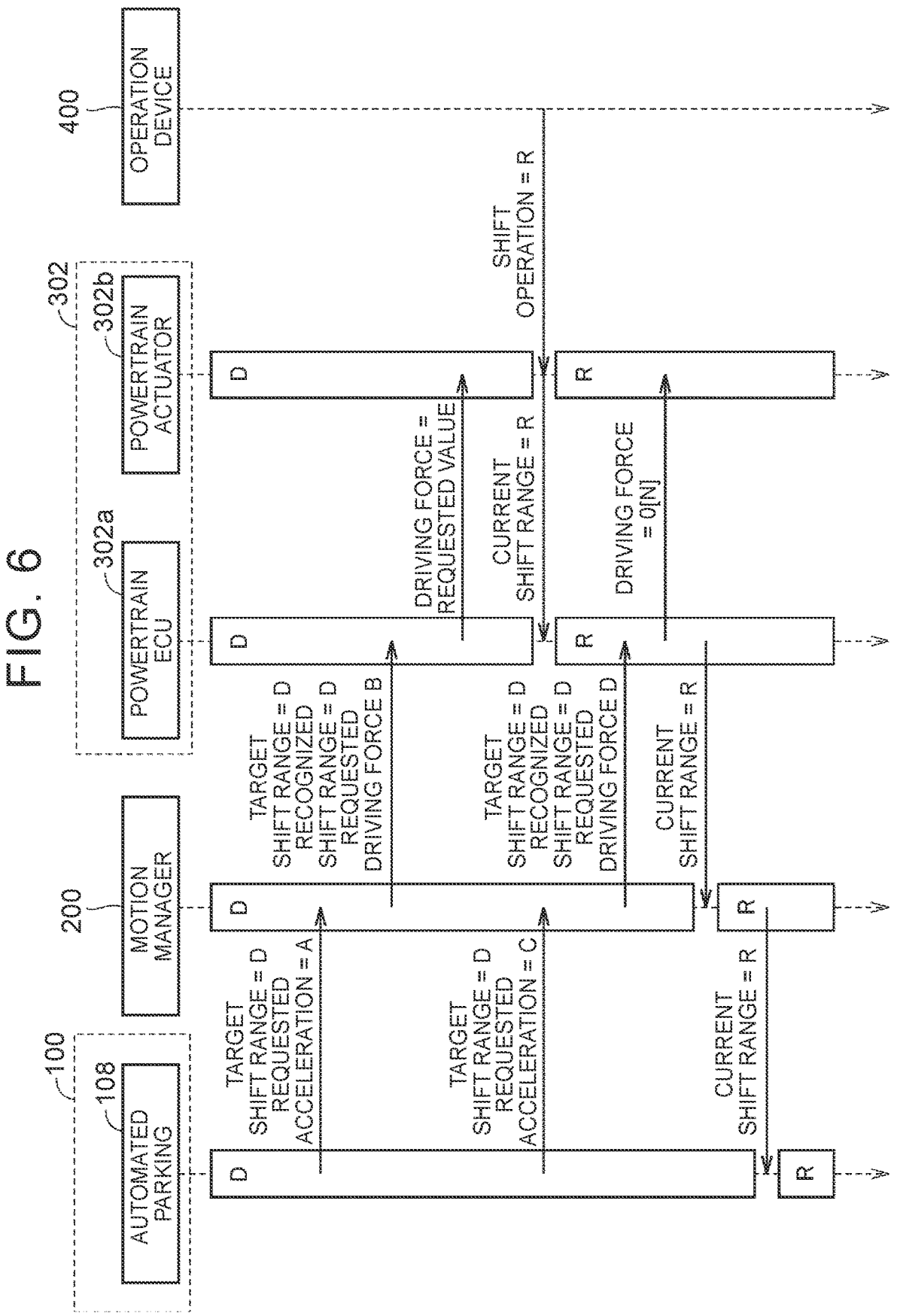
FIG. 6 is a diagram for describing an example of vehicle operations in accordance with the process to be executed by the powertrain ECU.

An example of operations of the vehicle 1 based on the structure and the flowchart described above will be described with reference to FIG. 6. FIG. 6 is a diagram for describing an example of the operations of the vehicle 1 in accordance with the process to be executed by the powertrain ECU 302a.

For example, it is assumed that the shift range is recognized as the D range in all of the application of the automated parking 108 in the driver assistance system 100, the motion manager 200, the powertrain ECU 302a, and the powertrain actuator 302b, and that the automated parking is in progress.

In such a case, when the driver assistance system 100 requests, for example, forward deceleration during the automated parking, a requested acceleration A (negative value) [m/s²] is output from the driver assistance system 100 to the motion manager 200. The driver assistance system 100 further outputs, to the motion manager 200, information indicating that the target shift range is the D range.

When the requested acceleration A is received from the driver assistance system 100, the motion manager 200 converts the requested acceleration into a requested driving force B (negative value) [N], and outputs, to the powertrain ECU 302*a*, the requested driving force B obtained by the conversion, the target shift range, and the recognized shift range that is the D range.

The powertrain ECU 302*a* acquires the D range as the target shift range (S100), acquires the D range as the recognized shift range (S102), and acquires the D range as the current shift range (S104). Since the target shift range, the recognized shift range, and the current shift range agree with each other (YES in S106), the driving force output is permitted (S108). Therefore, a driving force command associated with the requested driving force B is generated, and the generated driving force command is transmitted to the powertrain actuator 302*b*. As a result, the forward deceleration is performed during the automated parking. Then, the powertrain ECU 302*a* outputs, to the motion manager 200, information indicating that the current shift range is the D range (S112).

When the driver assistance system 100 requests, for example, forward deceleration during subsequent autonomous driving, a requested acceleration C (negative value) [m/s²] is output from the driver assistance system 100 to the motion manager 200. The driver assistance system 100 further outputs, to the motion manager 200, information indicating that the target shift range is the D range.

When the requested acceleration C is received from the driver assistance system 100, the motion manager 200 converts the requested acceleration into a requested driving force D (negative value) [N], and outputs, to the powertrain ECU 302*a*, the requested driving force D obtained by the conversion, the target shift range, and the recognized shift range that is the D range.

When a change to the R range is requested by a user's shift operation on the operation device 400 (shift lever) before the target shift range, the recognized shift range, and the requested driving force D are received from the motion manager 200, the shift range is changed to the R range in the powertrain actuator 302*b*. Therefore, information indicating that the current shift range has been changed to the R range is transmitted to the powertrain ECU 302*a* and stored in the storage 302*c*.

The powertrain ECU 302*a* acquires the D range as the target shift range (S100), acquires the D range as the recognized shift range (S102), and acquires the R range as the current shift range (S104). Since the target shift range and the recognized shift range do not agree with the current shift range (NO in S106), the driving force output is prohibited (S110). Therefore, the behavior of the vehicle 1 that is not based on the driver assistance, such as reverse acceleration, is suppressed by requesting zero as the driving force.

Then, the powertrain ECU 302*a* outputs, to the motion manager 200, information indicating that the current shift range is the R range (S112). Therefore, the motion manager 200 outputs the information indicating that the current shift range is the R range to the driver assistance system 100 including the application of the automated parking 108.

As described above, in the actuator system 300 according to the present embodiment, determination is made as to whether to permit the driving force output based on whether the shift range that is the precondition for setting the kinematic plan in the application of the automated parking

108, the shift range recognized by the motion manager 200, and the current shift range of the vehicle 1 agree with each other. Therefore, it is possible to suppress the request for the motion of the vehicle 1 that is not based on the driver assistance, for example, when the user's shift operation intervenes. Thus, it is possible to provide an actuator system, a vehicle, a motion manager, and a driver assistance system that suppress the request for the vehicle motion that is not based on the driver assistance.

Modifications will be described below.

In the embodiment described above, the application in the driver assistance system 100 outputs the target shift range to the actuator system 300 via the motion manager 200, and the actuator system 300 outputs the current shift range to the application in the driver assistance system 100 via the motion manager 200. The configuration is not particularly limited to such a configuration.

Figure 7:
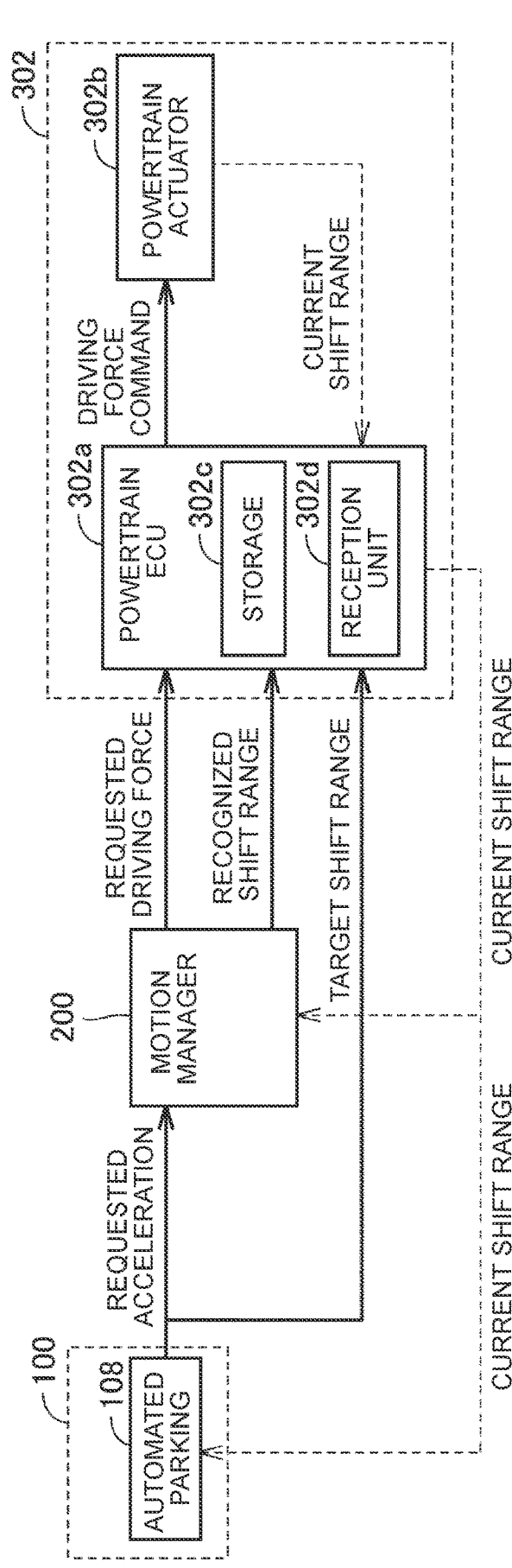
FIG. 7 is a diagram for describing an example of vehicle operations in a modification.

FIG. 7 is a diagram for describing an example of operations of the vehicle 1 in a modification. As shown in FIG. 7, for example, the application in the driver assistance system 100 may output the target shift range directly to the actuator system 300 without intermediation of the motion manager 200, and the actuator system 300 may output the current shift range to the motion manager 200 and the application in the driver assistance system 100.

In the embodiment described above, the driving force output is permitted when all of the target shift range, the recognized shift range, and the current shift range agree with each other. For example, the driving force output may be permitted when the recognized shift range and the current shift range agree with each other.

For example, during follow-up traveling by the application of the ACC 106, the powertrain ECU 302*a* may permit the driving force output when both the recognized shift range and the current shift range agree with each other. During the follow-up traveling by the application of the ACC 106, the powertrain ECU 302*a* may prohibit the driving force output when the recognized shift range and the current shift range do not agree with each other.

FIG. 8 is a diagram showing a relationship between a state of each shift range and whether to permit the driving force output in the modification. As shown in FIG. 8, for example, when both the recognized shift range and the current shift range are the D range, the driving force output in the ACC is permitted. Alternatively, when both the recognized shift range and the current shift range are the R range, the driving force output in the ACC is permitted.

When the recognized shift range is the D range and the current shift range is the R range, the driving force output in the ACC is prohibited. Alternatively, when the recognized shift range is the R range and the current shift range is the D range, the driving force output in the ACC is prohibited.

In the embodiment described above, determination is made as to whether to permit the driving force output by using the shift range as an example of the state of the actuator system. The embodiment is not particularly limited to the state of the actuator system. For example, determination may be made as to whether to permit the driving force output by using the state of the vehicle. Examples of the state of the vehicle include a depression state of the brake pedal.

Figure 9:
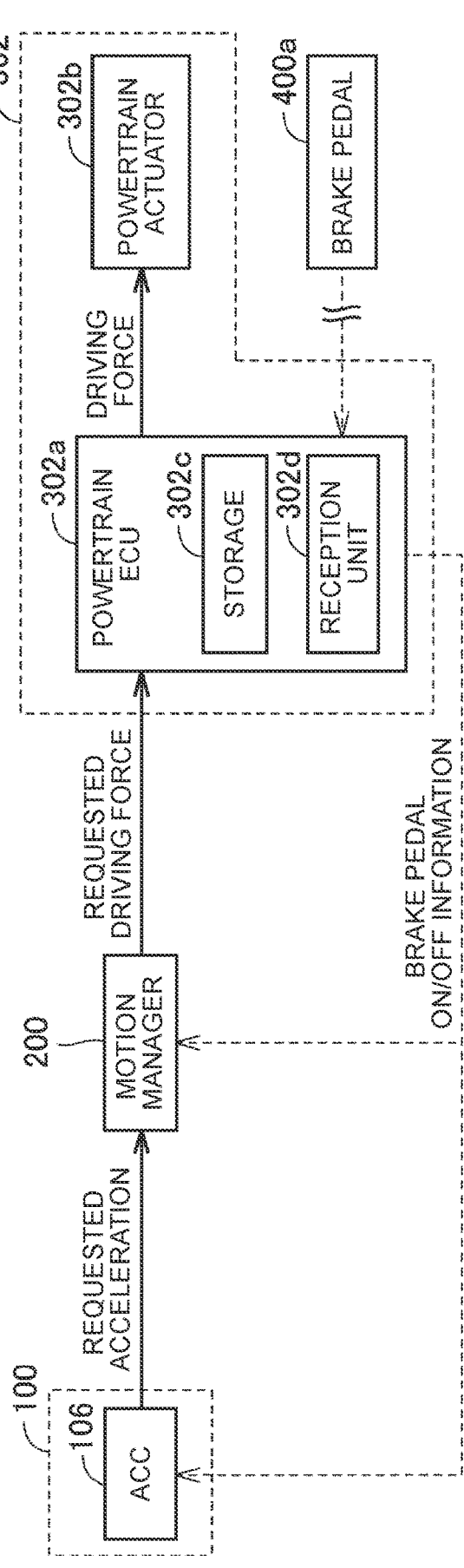
FIG. 9 is a diagram for describing another example of vehicle operations in the modification.

FIG. 9 is a diagram for describing another example of operations of the vehicle 1 in the modification. As shown in FIG. 9, for example, it is assumed that the application of the ACC 106 in the driver assistance system 100 outputs a requested acceleration to the motion manager 200.

For example, during the follow-up traveling, the application of the ACC 106 outputs information about the requested acceleration to the motion manager 200.

The motion manager 200 converts the requested acceleration received from the application of the ACC 106 into a requested driving force, and transmits the requested driving force to the powertrain system 302.

The reception unit 302*d* of the powertrain ECU 302*a* receives the requested driving force from the motion manager 200, and also receives a signal indicating whether a brake pedal 400*a* is depressed (ON state) or released (OFF state). The brake pedal 400*a* is included in the operation device 400. A detection device that detects whether the brake pedal 400*a* is in the ON state or the OFF state is included in the sensor unit 308. The received pieces of information are stored in the storage 302*c*.

For example, the powertrain ECU 302*a* prohibits the driving force output in a case where the brake pedal 400*a* is in the ON state continuously for a predetermined period (for example, about several hundred milliseconds) or longer when the requested driving force is received from the motion manager 200. For example, the powertrain ECU 302*a* permits the driving force output in a case where the brake pedal 400*a* is in the OFF state when the requested driving force is received from the motion manager 200.

FIG. 10 is a diagram showing a relationship between a state of the brake pedal and whether to permit the driving force output. FIG. 10 shows that the driving force output is permitted when the brake pedal is in the OFF state, and that the driving force output is prohibited when the brake pedal is in the ON state continuously for the predetermined period or longer.

Thus, it is possible to reduce the occurrence of a state in which the driving force is output though the brake pedal 400*a* is depressed by the user for the predetermined period or longer during the follow-up traveling by the application of the ACC 106.

In the present embodiment, description has been given of the exemplary configuration in which the motion manager 200 includes the reception unit 202, the arbitration unit 204, the calculation unit 206, and the distribution unit 208. For example, the motion manager 200 may include a first motion manager that at least receives kinematic plans from the applications, and a second motion manager that can communicate with the first motion manager and requests a motion from the actuator system 300. In this case, the function of the arbitration unit 204, the function of the calculation unit 206, and the function of the distribution unit 208 may be implemented in either the first motion manager or the second motion manager.

The modifications described above may entirely or partially be combined as appropriate.

It is understood that the embodiment disclosed herein is illustrative and not limitative in all respects. The scope of the present disclosure is shown by the claims rather than by the above description and is intended to include all modifications within the meaning and scope equivalent to those of the claims.

What is claimed is:

1. An actuator system to be provided in a vehicle and configured to realize a motion request generated by a motion manager configured to arbitrate kinematic plans related to driver assistance for the vehicle, the motion request being generated by using a result of arbitration of the kinematic plans, the actuator system comprising:

a plurality of processors each configured to receive predetermined information from the motion manager, the predetermined information including: (i) instructions for operation of one or more actuators and (ii) desired first information related to desired state of the vehicle as determined by the motion manager; and wherein the one or more actuators are configured to realize the motion request by using the predetermined information, wherein each of the plurality of processors are configured to:

obtain the desired first information related to a desired state of the vehicle that is recognized by the motion manager; and obtain an actual second information related to an actual current state of the vehicle based on sensor data;

determine whether to permit control on the one or more actuators by using a result of comparison between the desired first information and the actual second information, wherein:

the one or more actuators include actuators related to a powertrain system, actuators related to a brake system, and actuators related to a steering system;

each of the powertrain system, the brake system, and the steering system includes a respective dedicated processor from the plurality of processors, the dedicated processors comprising (i) a powertrain system processor for the powertrain system, (ii) a brake system processor for the brake system, and (iii) a steering system processor for the steering system, each dedicated processor being configured to control its corresponding actuator system;

wherein the desired first information includes one or more selected from:

(i) a desired state of a powertrain system, (ii) a desired state of a brake system, (iii) a desired state of a steering system, or (iv) a desired value from a sensor unit; and wherein the actual second information includes one or more selected from:

(i) an actual current state of the powertrain system, (ii) an actual current state of the brake system, (iii) an actual current state of the steering system, or (iv) an actual desired value from the sensor unit.

2. The actuator system according to claim 1, wherein:

the kinematic plans are received by the motion manager from a driver assistance system configured to set the kinematic plans; and each of the plurality of processors are configured to:

receive third information related to a state of the vehicle that is a precondition for setting the kinematic plans in the driver assistance system; and determine whether to permit the control on its corresponding actuator by using a result of comparison among the first information, the actual second information, and the third information, wherein the third information includes one or more selected from:

(i) a precondition related to the powertrain system, (ii) a precondition related to the brake system, (iii) a precondition related to the steering system, or (iv) a precondition value from the sensor unit.

3. The actuator system according to claim 2, further comprising a storage configured to store the actual second information.

4. The actuator system according to claim 3, wherein the plurality of processors are configured to:

receive the actual second information; and store the received actual second information in the storage.

5. The actuator system according to claim 3, wherein the plurality of processors are configured to, when at least two of the first information, the actual second information, and the third information agree with each other, permit the control on the one or more actuators configured to realize the motion request.

6. The actuator system according to claim 3, wherein the plurality of processors are configured to, when the state of the vehicle is a predetermined state, control the one or more actuators to realize the motion request.

7. The actuator system according to claim 1, wherein the state of the vehicle includes a state of the one or more actuators.

8. A vehicle comprising:

a driver assistance system configured to set a kinematic plan related to driver assistance for the vehicle;

a motion manager configured to arbitrate multiple kinematic plans set by the driver assistance system; and an actuator system configured to realize a motion request generated by using a result of arbitration of the kinematic plans in the motion manager, wherein:

the actuator system includes:

a plurality of processors each configured to receive predetermined information from the motion manager, the predetermined information including: (i) instructions for operation of one or more actuators and (ii) desired first information related to desired state of the vehicle as determined by the motion manager; and the one or more actuators configured to realize the motion request by using the predetermined information; and each of the plurality of processors are configured to:

obtain the desired first information related to a desired state of the vehicle that is recognized by the motion manager;

obtain an actual second information related to an actual current state of the vehicle based on sensor data; and determine whether to permit control on the one or more actuators by using a result of comparison between the desired first information and the actual second information related to a current state of the vehicle, wherein:

the one or more actuators include actuators related to a powertrain system, actuators related to a brake system, and actuators related to a steering system;

each of the powertrain system, the brake system, and the steering system includes a respective dedicated processor from the plurality of processors, the dedicated processors comprising (i) a powertrain system processor for the powertrain system, (ii) a brake system processor for the brake system, and (iii) a steering system processor for the steering system, each dedicated processor being configured to control its corresponding actuator system;

wherein the desired first information includes one or more selected from:

(i) a desired state of a powertrain system, (ii) a desired state of a brake system, (iii) a desired state of a steering system, or (iv) a desired value from a sensor unit; and wherein the actual second information includes one or more selected from:

(i) an actual current state of the powertrain system, (ii) an actual current state of the brake system, (iii) an actual current state of the steering system, or (iv) an actual desired value from the sensor unit.

* * * * *